United States Patent
Mathur et al.

(10) Patent No.: US 10,963,036 B2
(45) Date of Patent: Mar. 30, 2021

(54) IDLE LOOP DETECTION AND CONTROL FOR PROCESSORS

(71) Applicant: NXP USA, Inc., Austin, TX (US)

(72) Inventors: Ashish Mathur, New Delhi (IN); Sandeep Jain, Ghaziabad (IN)

(73) Assignee: NXP USA, Inc., Austin, TX (US)

(*) Notice: Subject to any disclaimer, the term of this patent is extended or adjusted under 35 U.S.C. 154(b) by 333 days.

(21) Appl. No.: 15/953,778

(22) Filed: Apr. 16, 2018

(65) Prior Publication Data
US 2019/0317589 A1 Oct. 17, 2019

(51) Int. Cl.
*G06F 1/32* (2019.01)
*G06F 1/3287* (2019.01)
*G06F 1/26* (2006.01)

(52) U.S. Cl.
CPC .............. *G06F 1/3287* (2013.01); *G06F 1/26* (2013.01)

(58) Field of Classification Search
CPC ..................................... G06F 1/32; G06F 1/26
See application file for complete search history.

(56) References Cited

U.S. PATENT DOCUMENTS

| | | | | |
|---|---|---|---|---|
| 5,586,332 A * | 12/1996 | Jain | ....................... | G06F 1/3203 713/322 |
| 5,815,692 A * | 9/1998 | McDermott | .............. | G06F 1/10 713/501 |
| 5,815,693 A * | 9/1998 | McDermott | .............. | G06F 1/08 713/501 |
| 6,810,373 B1 * | 10/2004 | Harmon | .................. | G06F 30/33 703/14 |
| 7,337,339 B1 * | 2/2008 | Choquette | ............. | G06F 1/3203 713/300 |
| 7,343,590 B2 | 3/2008 | Tormey et al. | | |
| 7,684,971 B1 | 3/2010 | Larsson et al. | | |
| 7,779,191 B2 | 8/2010 | Lu et al. | | |
| 8,307,233 B2 * | 11/2012 | Flachs | ..................... | G06F 13/36 713/323 |
| 8,352,944 B2 | 1/2013 | Weissman et al. | | |
| 8,744,831 B2 | 6/2014 | Ishii et al. | | |
| 9,134,787 B2 | 9/2015 | Longnecker et al. | | |

* cited by examiner

*Primary Examiner* — Phil K Nguyen

(57) ABSTRACT

Systems and method for idle loop detection and control are disclosed. A processor operates in operating modes including an active mode and a disabled mode, and an interconnect bus is coupled between the processor and one or more additional electronic circuits. Logic within the processor is coupled to snoop the interconnect bus, and the logic is programmed to detect a new idle loop based upon repeated instructions on the interconnect bus and to place the processor in the disabled mode based upon execution of the new idle loop, which represents a previously unknown idle loop for the processor. Further, the logic can be programmed to store state data for the processor when the new idle loop is detected, and the logic can also be programmed to place the processor in the active mode based upon detection of a wakeup event for the new idle loop on the interconnect bus.

16 Claims, 10 Drawing Sheets

IDLE LOOP DETECTION AND CONTROL FOR PROCESSORS

TECHNICAL FIELD

This technical field relates to processors and, more particularly, to control of idle loops in processors for system-on-a-chip computer systems.

BACKGROUND

Multicore system-on-a-chip (SoC) computer systems include software instructions executing on one or more processors, and these processors communicate with other electronic circuits such as hardware accelerators, hardware peripherals, software instructions executing on other processors, and/or other electronic circuits. In such systems, there are occasions where the instructions executing on a processor awaits occurrence of certain events from a hardware peripheral, a hardware accelerator, or from software instructions executing on another processor. Examples of such situations include but are not limited to, software polling for a specific status update from hardware, software thread execution on one processor communicating with another software thread running on another processor, software executing in a branch-to-self loop awaiting interrupt for further processing, and/or other processes where a processor waits for a response from another electronic circuit. In such wait conditions, the software instructions executed by the processor are not doing useful work while waiting for occurrence of the event, thereby wasting underlying system resources. Such a code fragment of wasted software instructions is known as an "idle loop" to signify that the processor is not making tangible forward progress while performing these wasted software instructions. Code fragments known a priori to be idle loops can be detected during system operation, and a power-down command can be issued to the processor until the event for ending the idle loop has occurred.

FIG. 1 (Prior Art) is a block diagram of an example embodiment 100 for a prior solution where a processor, implemented as central processing unit (CPU), is placed in a disabled mode upon detection of executing code fragment a priori known to be an idle loop. In block 102, the CPU starts execution. In block 104, a determination is made whether the CPU is already disabled by an idle loop optimization with respect to known idle loop code fragments. If the determination is "NO," then flow passes to block 110 where the code is executed. If the determination is "YES," then flow passes to block 106 where a determination is made whether an a priori wake event is pending for the CPU. If "NO," then the flow loops back to block 106. If "YES," then flow passes to block 108. In block 108, a wakeup is executed for the CPU, and the CPU then prepares for code execution. Block 110 is then reached where code is executed. After code is executed in block 110, block 112 is reached where a determination is made whether the CPU is executing a code fragment known a priori to be an idle loop. If "NO," then flow passes to block 110 where code is executed. This continues until the determination in block 112 is "YES" and block 114 is reached. In block 114, preparation is made for the CPU to enter a disabled mode. Block 116 is then reached where the CPU is disabled. Flow then passes back to block 104.

Thus, although mechanisms provided in prior solutions improve performance by disabling the CPU under the condition where software is executing an idle loop rely, these mechanism require prior knowledge of what software code fragments cause the idle-loops. This requirement for a priori knowledge (i.e., known before operation of the CPU rather than from observation or experience during operation of the CPU) for potential code fragments causing idle loops means that code fragments that cause idle loops, but are not known a priori to cause idle loops, are missed. As such, prior solutions are not effective for such idle loops that are unknown prior to operation of the CPU.

DESCRIPTION OF THE DRAWINGS

It is noted that the appended figures illustrate only example embodiments and are, therefore, not to be considered as limiting the scope of the present invention. Elements in the figures are illustrated for simplicity and clarity and have not necessarily been drawn to scale.

DETAILED DESCRIPTION

Figure 1:
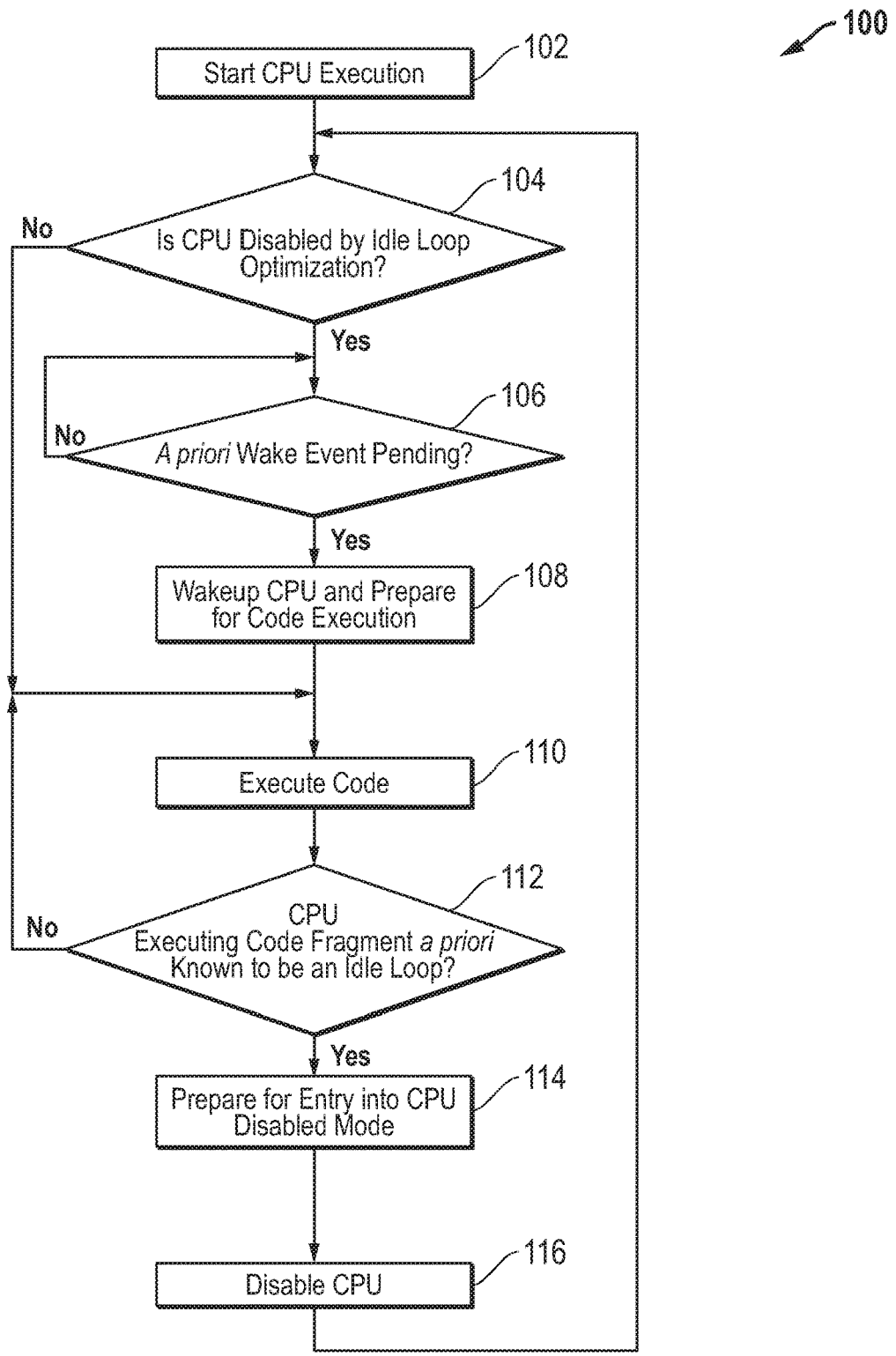
FIG. 1 (Prior Art) is a block diagram of an example embodiment for a prior solution where a processor, implemented as central processing unit (CPU), is placed in a disabled mode upon detection of executing code fragment a priori known to be an idle loop.

Methods and systems for idle loop detection and control are disclosed. A variety of additional and/or different features and variations can also be implemented.

As described above, traditional multicore computer systems include software instructions that execute on a processor and that communicate with other entities such as hardware accelerators, hardware peripherals, software executing on other processors, and/or responses from other electronic circuits. The disclosed embodiments provide structured techniques to automatically detect idle loops that are not known a priori to be idle. Once detected, loop wakeup conditions are learned and recorded into event monitoring structures. The processor is then disabled until occurrence of a wakeup event is detected, thereby conserving system resources that would have otherwise been wasted.

For one embodiment, the disclosed embodiments provide an apparatus and method to improve and/or optimize idle-loop execution without requiring a priori knowledge of the software instructions being executed or a priori knowledge that a code segment being executed is an idle-loop code segment. The disclosed techniques are based on dynamic loop learning and can handle different types of idle-loop scenarios. These idle-loop scenarios include loops polling for hardware status updates, waiting on an asynchronous interrupt, polling a shared memory location such as those involved in handshake between software processes executing on multiple processors, and/or other idle-loop scenarios where a processor is waiting on one or more events.

The dynamic loop-learning and optimization techniques described herein are implemented using dedicated loop-controller logic and additional new data structures to store loop information and wakeup conditions. For one embodiment, the CPU is modified to include loop-controller logic that monitors instruction sequences executing on the CPU in order to detect occurrence of software code idle-loops. Once an idle loop is detected, the loop-controller logic initiates and controls a loop-learning procedure that achieves the following: (1) identification of loop wakeup conditions including specific system events, occurrence of which, triggers CPU wakeup, and (2) identification of system state update operations including specific operations to be executed by the CPU upon wakeup of the CPU from a disabled mode, so as to ensure, that system state is identical to what it would have been if the CPU was not disabled. For further embodiments, the CPU is modified to form and use additional data structures that store loop states, wakeup information, and branch history. In one embodiment, these data structures are implemented as a loop-state information (LSI) structure, a wakeup queue structure, and a loop-branch-history structure. These data structures are used to store information generated by loop-learning procedures described herein. Once loop-learning is completed and a loop is identified as a candidate for idle-loop optimization, the loop-controller logic disables the CPU, thereby conserving system resources. After CPU is disabled, the loop-controller logic monitors occurrence of wakeup events by snooping the system bus and initiates CPU wakeup once such a wakeup event is detected. Upon detection of a CPU wakeup event, the loop-controller logic updates system state to what it would have been if the CPU had not been disabled, deletes the wakeup monitors that had been setup prior to the CPU being disabled, and resumes normal CPU execution.

The disclosed techniques can be applied to a wide variety of processor environments to improve and/or optimize system performance for hardware and/or virtualized systems as well as simulated systems. In contrast to prior solutions, the embodiments described herein provide the following advantageous features: (1) automatic loop analysis to identify code segment idle-loops being executed by a CPU that were previously unknown (e.g., not known a priori) to be idle-loop code segments, (2) automatic learning of CPU wakeup conditions through loop analysis, (3) automatic setup and removal of wakeup monitors at the time of entry to and exit from idle-loop disabled mode of the CPU, and (4) no requirement to modify or upgrade software to infer special processor instructions or create additional driver layers. Additional and/or different features can also be provided while still taking advantage of the dynamic loop-learning and optimization techniques described herein.

Figure 2:
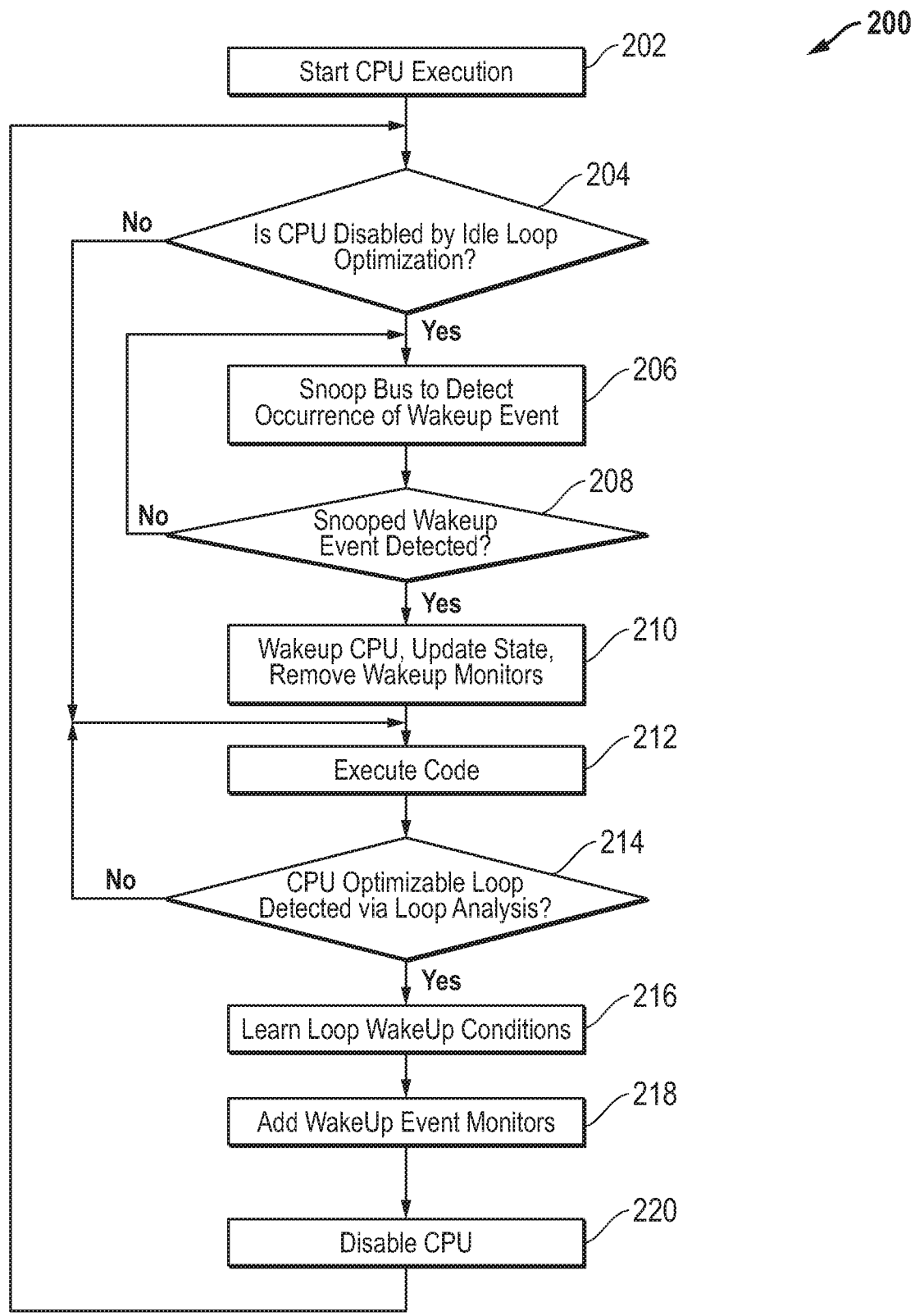
FIG. 2 is a block diagram of an example embodiment according to the present inventions where a processor, implemented as central processing unit (CPU), is placed in a disabled mode upon detection of executing code fragment that is newly detected to be an idle loop without a priori knowledge.

FIG. 2 is a block diagram of an example embodiment 200 according to the present inventions where a processor, implemented as central processing unit (CPU), is placed in a disabled mode upon detection of executing code fragment that is newly detected to be an idle loop without a priori knowledge. In block 202, the CPU starts execution. In block 204, a determination is made whether the CPU is already disabled by an idle loop optimization with respect to known idle loop code fragments. If the determination is "NO," then flow passes to block 212 where the code is executed. If the determination is "YES," then flow passes to block 206 where a system bus is snooped to detect occurrence of a wakeup event for the CPU. In block 208, a determination is made whether a wakeup event has been detected from transactions snooped from the system bus. If "NO," then the flow loops back to block 206. If "YES," then flow passes to block 210. In block 210, a wakeup is executed for the CPU where the state for the CPU is updated and wakeup monitors are removed. The CPU is then prepared for code execution. Block 212 is then reached where code is executed. After code is executed in block 212, block 214 is reached where a determination is made whether an idle loop is detected for the CPU from loop analysis for conditions that are not known a priori to be an idle loop code segment. If "NO," then flow passes to block 212 where code is executed. This continues until the determination in block 214 is "YES" and block 216 is reached. In block 216, wakeup conditions for the CPU are learned for the idle loop, and these wakeup conditions are stored for later use. In block 218, wakeup event monitors are added with respect to the monitoring of the system bus. In block 220, the CPU is placed in a disabled mode. Flow then passes back to block 204.

Figure 3:
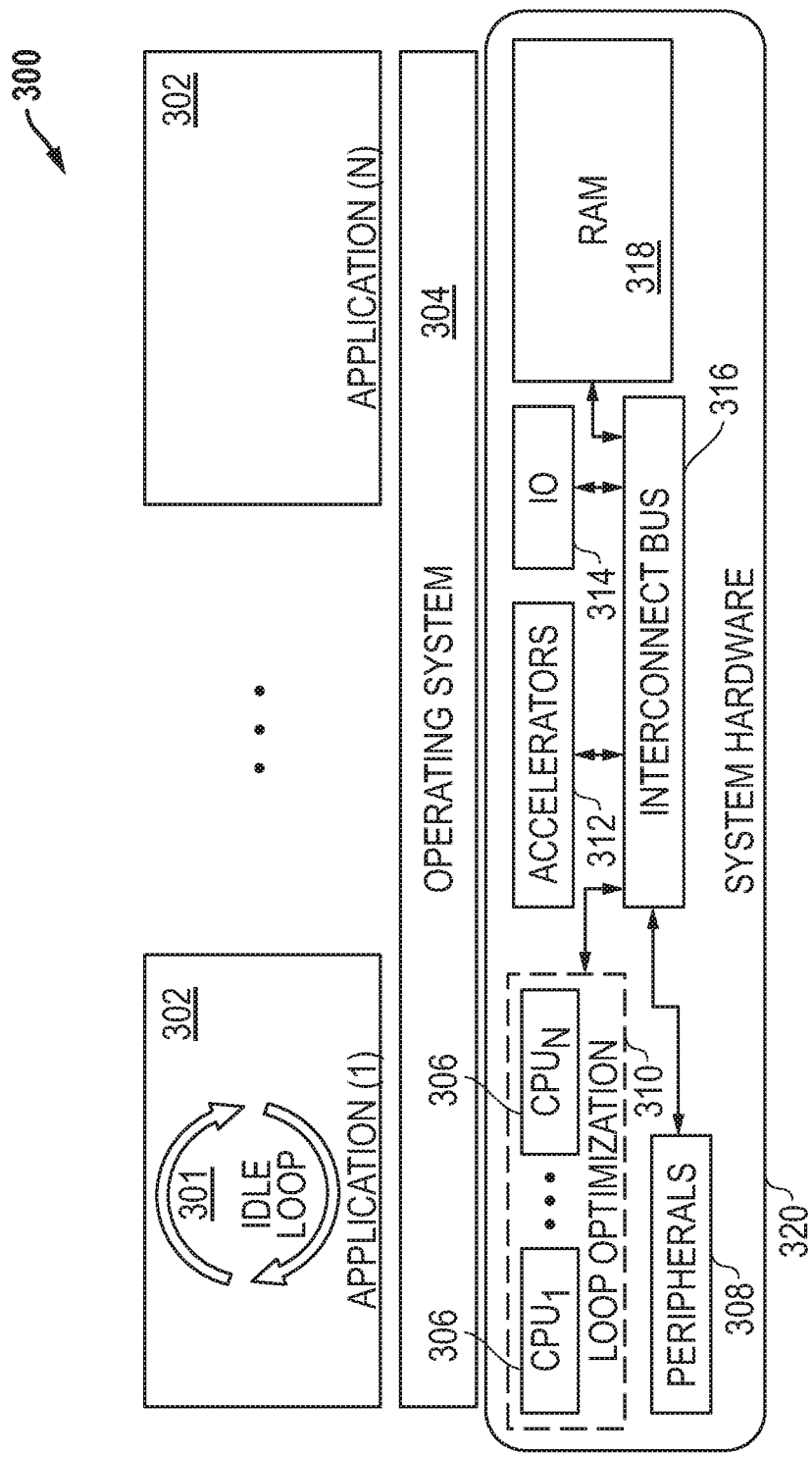
FIG. 3 is an example embodiment for a CPU hardware level application where the idle-loop execution optimization techniques described herein are employed for user applications running on top of the host operating system.
Figure 4:
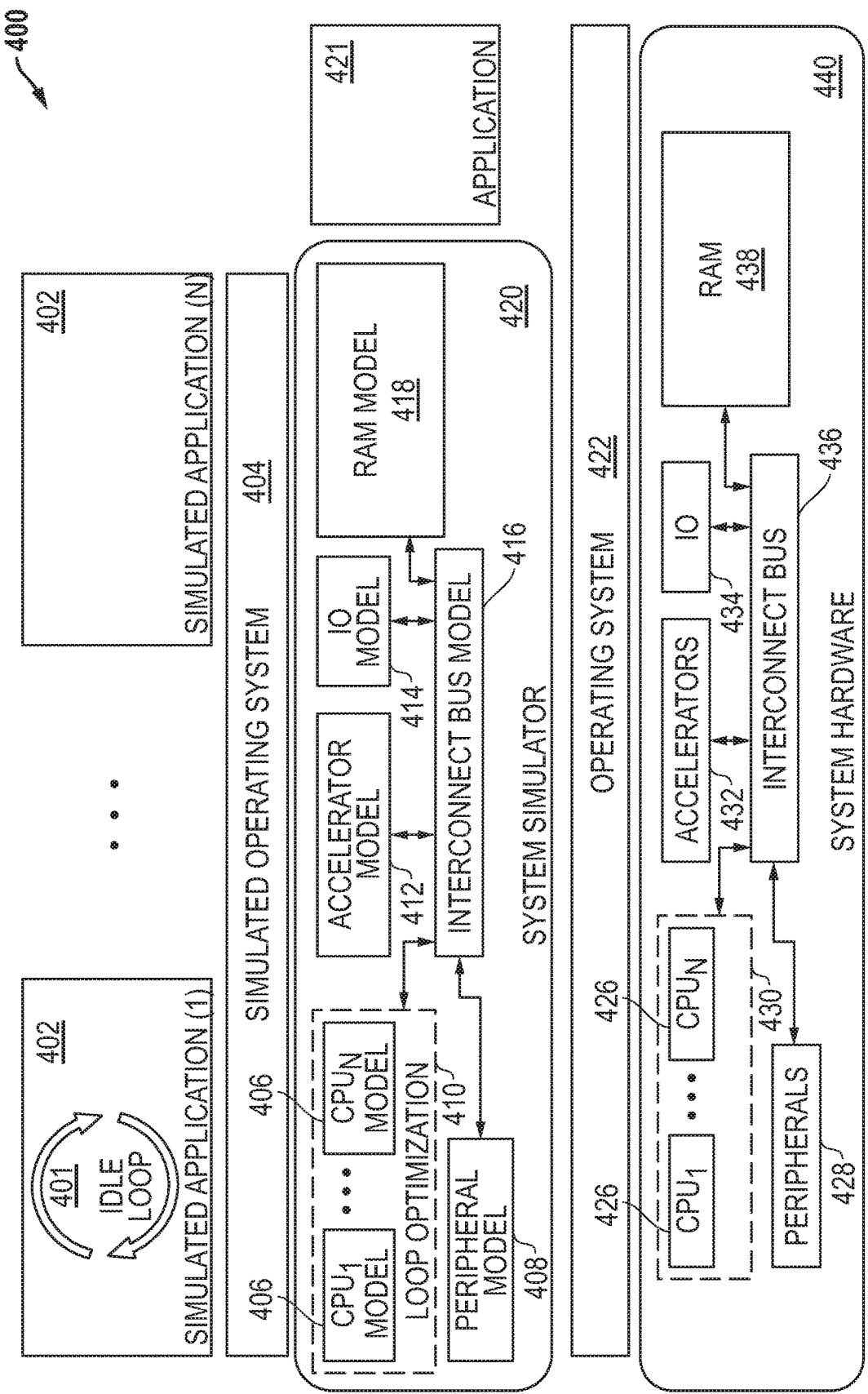
FIG. 4 is an example embodiment for a system simulator level application where the idle-loop execution optimization techniques described herein are employed in simulated user applications.
Figure 5:
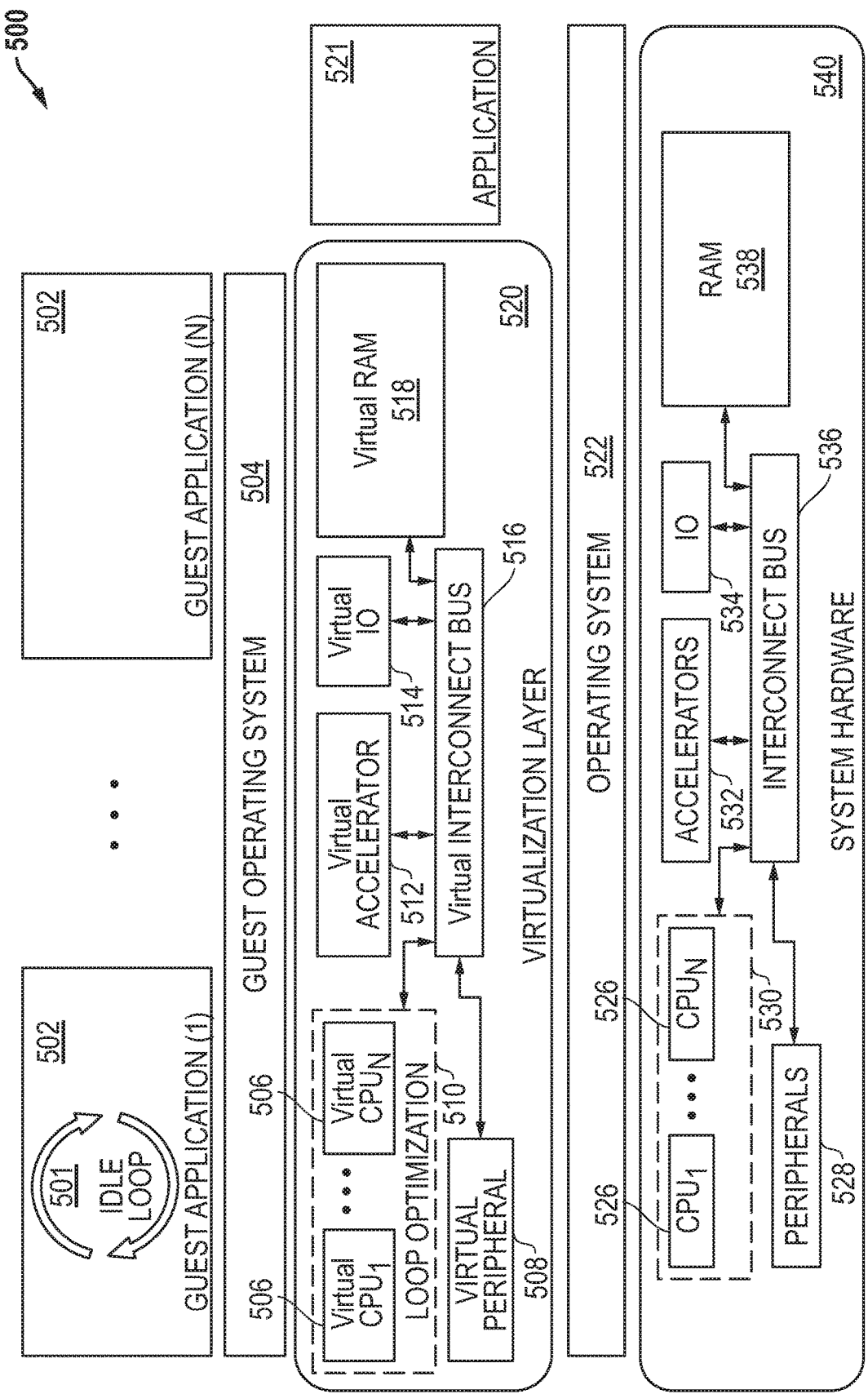
FIG. 5 is an example embodiment for virtualization layer applications where the idle-loop execution optimization techniques described herein are employed with respect to hosted virtual applications.

FIGS. 3-5 provide example embodiments for system implementations that apply the dynamic loop-learning and optimization techniques described herein to a hardware level application, a system simulator level application, and to a virtualization layer application, respectively.

FIG. 3 is an example embodiment 300 for a CPU hardware level application where the idle-loop execution optimization techniques described herein are employed for user applications running on top of the host operating system. For embodiment 300, software instructions are executed by one or more CPUs 306 to run one or more applications 302 on top of an operating system 304. The loop optimization 310 described herein is applied to the one or more CPUs 306 to detect an idle loop 301 entered by a code segment within the software instructions being executed by the one or more CPUs 306. In addition to the one or more CPUs 306, the system hardware 320 for the embodiment 300 includes hardware accelerators 312, hardware peripherals 308, input-output ports (IO) 314, and memory 318 (e.g., random access memory (RAM)). These components of the system hardware 320 communicate with each other through a system interconnect bus 316, which can include one or more different electrical bus connections among the various components of the system hardware 320.

FIG. 4 is an example embodiment 400 for a system simulator level application where the idle-loop execution optimization techniques described herein are employed in simulated user applications. A system simulator is a software program that emulates the behavior of a target system including processors, accelerators, peripherals, and/or other features to provide a tool for system architecture exploration, software development, and debug. For embodiment 400, simulated software instructions are executed by one or more simulated CPUs 406 to run one or more simulated applications 402 on top of a simulated operating system 404.

The loop optimization 410 described herein is applied to the one or more simulated CPUs 406 to detect an idle loop 401 entered by a code segment within the simulated software instructions being executed by the one or more simulated CPUs 406. In addition to the one or more simulated CPUs 406, the system simulator 420 for the embodiment 400 includes a hardware accelerator model 412, a hardware peripheral model 408, an input-output port model (IO) 414, and a memory model 418 (e.g., random access memory (RAM)). These model components of the system simulator 420 communicate with each other through an interconnect bus model 416. In addition, software instructions are executed by one or more CPUs 426 to run the system simulator 420 on top of an operating system 422. The system hardware 440 for the embodiment 400 includes the one or more CPUs 426, hardware accelerators 432, hardware peripherals 428, input-output ports (IO) 434, and memory 438 (e.g., random access memory (RAM)). These components of the system hardware 440 communicate with each other through a system interconnect bus 436, which can include one or more different electrical bus connections among the various components of the system hardware 440.

FIG. 5 is an example embodiment for virtualization layer applications where the idle-loop execution optimization techniques described herein are employed with respect to hosted virtual applications. The virtualization layer, also known as the hypervisor or virtual machine monitor, is software that manages host hardware resources to present a virtual resource view of the host platform and manages the execution of guest operating systems. Virtualization improves scalability, power consumption, cost, and efficiency of computer systems. For embodiment 500, virtual software instructions are executed by one or more virtual CPUs 506 to run one or more guest applications 502 on top of a guest operating system 504. The loop optimization 510 described herein is applied to the one or more virtual CPUs 506 to detect an idle loop 501 entered by a code segment within the virtual software instructions being executed by the one or more virtual CPUs 506. In addition to the one or more virtual CPUs 506, the virtualization layer 520 for the embodiment 500 includes a virtual hardware accelerator 512, a virtual hardware peripheral 508, virtual input-output ports (IO) 514, and virtual memory model 518 (e.g., random access memory (RAM)). These virtual components of the virtualization layer 520 communicate with each other through a virtual interconnect bus 516. In addition, software instructions are executed by one or more CPUs 526 to run the virtualization layer 520 on top of an operating system 522. The system hardware 540 for the embodiment 500 includes the one or more CPUs 526, hardware accelerators 532, hardware peripherals 528, input-output ports (IO) 534, and memory 538 (e.g., random access memory (RAM)). These components of the system hardware 540 communicate with each other through a system interconnect bus 536, which can include one or more different electrical bus connections among the various components of the system hardware 540.

Figure 6A:
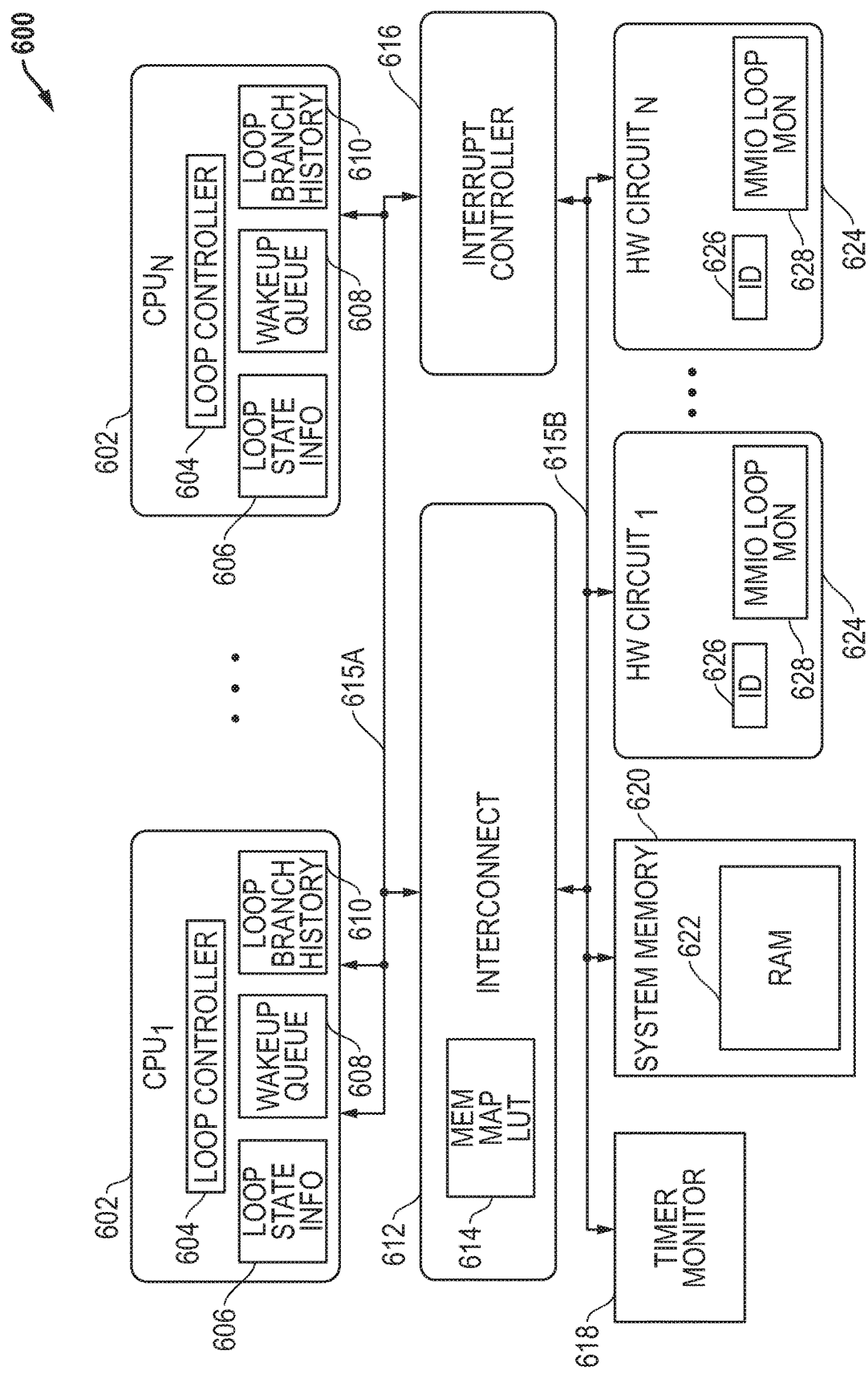
FIG. 6A is a block diagram of an example embodiment that includes more details with respect to the loop controllers and the data structures generated by a system implementation for the dynamic loop-learning and optimization techniques described herein.
Figure 6B:
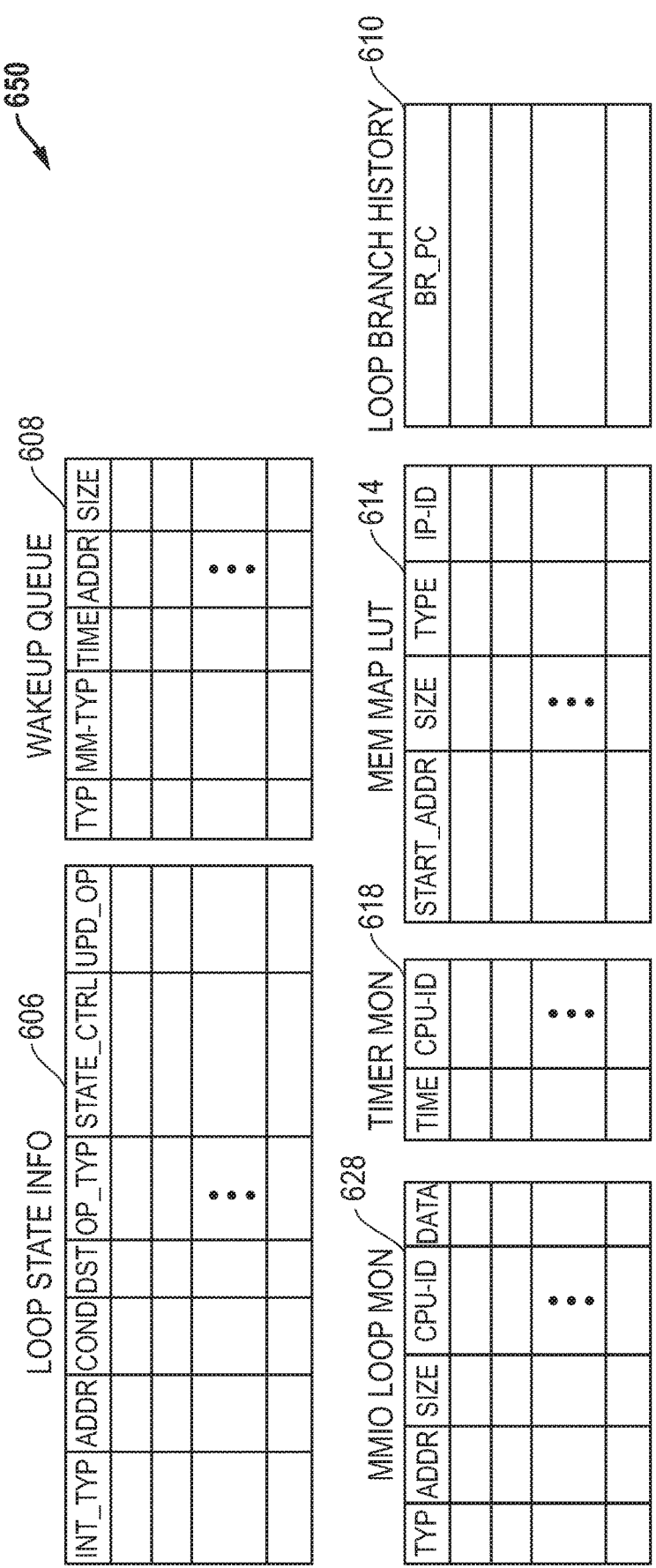
FIG. 6B provides example fields for the data structures.

FIGS. 6A-B provides example embodiments for system implementations and related loop data structures for the dynamic loop-learning and optimization techniques described herein. It is noted that further details with respect to the fields and data structures shown with respect to FIGS. 6A-B are described in more detail below with respect to Details for Loop Structures Details for Loop Monitors.

Now looking first to FIG. 6A, a block diagram of an example embodiment 600 is provided that includes more details with respect to the loop controllers 604 and the data structures generated by a system implementation for the dynamic loop-learning and optimization techniques described herein. The system includes CPUs 602, interconnect 612, interrupt controller 616, system memory 620, hardware IP modules 624, and a timer monitor structure 618 as described in more detail below. The loop controller 604 generates and uses data structures 606, 608, and 610. The data structure 606 is a loop state information (LSI) data structure that is a per-CPU structure, is implemented as part of the CPU 602, and stores information pertaining to idle-loop learning operations. This LSI data structure 606 has an entry for each instruction within the idle-loop code segment. Data structure 608 is a wakeup queue data structure that is a per-CPU structure, is implemented as part of the CPU 602, and stores information regarding wakeup events. Each entry of the wakeup queue data structure 608 represents a system event that is used to wake-up a CPU 602 that has been earlier disabled due to execution of idle-loop. Data structure 610 is a loop branch history data structure that is a per-CPU structure, is implemented as part of the CPU 602, and stores historical information for the branches executed by the CPU 602. The data structure 628 is a memory-mapped-IO (MMIO) data structure where idle loop addresses being polled are associated with hardware IP memory mapped registers. The MMIO data structure 628 is implemented as part of hardware IP model 624 and operates to wake up a disabled CPU upon detection of write access to that address. Data structure 618 is a time monitor data structure where each entry corresponds to a time bound wake-up event setup to wake-up a CPU 602 disabled due to idle-loop operation. Data structure 614 is a memory map lookup table (LUT) implemented as part of interconnect 612 where each entry provides an address range mapped to each hardware IP module 624 and system memory 620. The system memory 620 can be implemented, for example, using a RAM 622 and/or other memory circuitry. An interrupt controller 616 arbitrates the interrupt processing related communications on bus connections 615A and 615B associated with the interconnect 612.

FIG. 6B provides example fields for the data structures 606, 608, 610, 614, 618, and 628. The loop state information (LSI) data structure 606 includes the following example fields: an instruction type (INT_TYP) field, an address (ADDR) field, a condition (COND) field, a destination (DST) field, an operation type (OP_TYP) field, a state control (STATE CTRL) field, and an update operation (UPD_OP) field. The wakeup queue data structure 608 includes the following example fields: a type (TYP) field, a memory map type (MM-TYP) field, a time (TIME) field, an address (ADDR) field, and a size (SIZE) field. The loop branch history data structure 610 includes the following example field: a branch program counter (BR_PC) field. The memory map LUT data structure 614 includes the following example fields: a start address (START_ADDR) field, a size (SIZE) field, a type (TYP) field, and an IP identifier (IP-ID) field. The timer monitor data structure 618 includes the following example fields: a time (TIME) field and a CPU identifier (CPU-ID) field. The MMIO loop monitor data structure 628 includes the following example fields: a type (TYP) field, an address (ADDR) field, a size (SIZE) field, a CPU identifier (CPU-ID) field, and a data (DATA) field.

Figure 7:
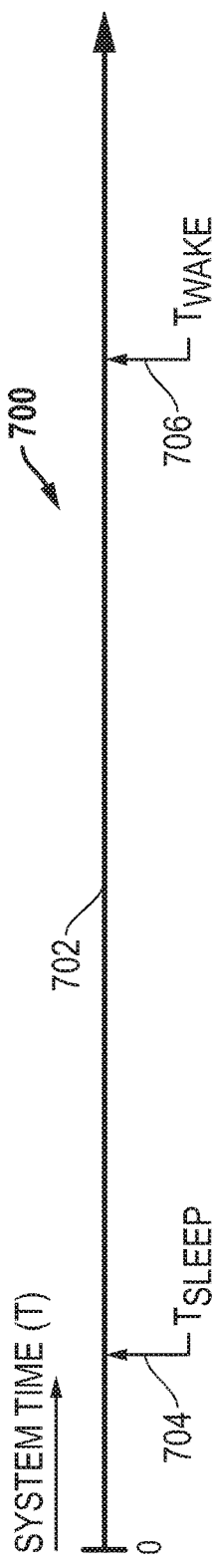
FIG. 7 is an embodiment for a time graph of system execution.

FIG. 7 is an embodiment 700 for a time graph of system execution. The sleep time (TSLEEP) represents the system time 702 at which a CPU is disabled upon detection of an idle-loop. The wake time (TWAKE) 706 marks the time of the occurrence of a wakeup event to re-enable execution of a CPU that was previously disabled due to idle-loop detection.

Figure 8:
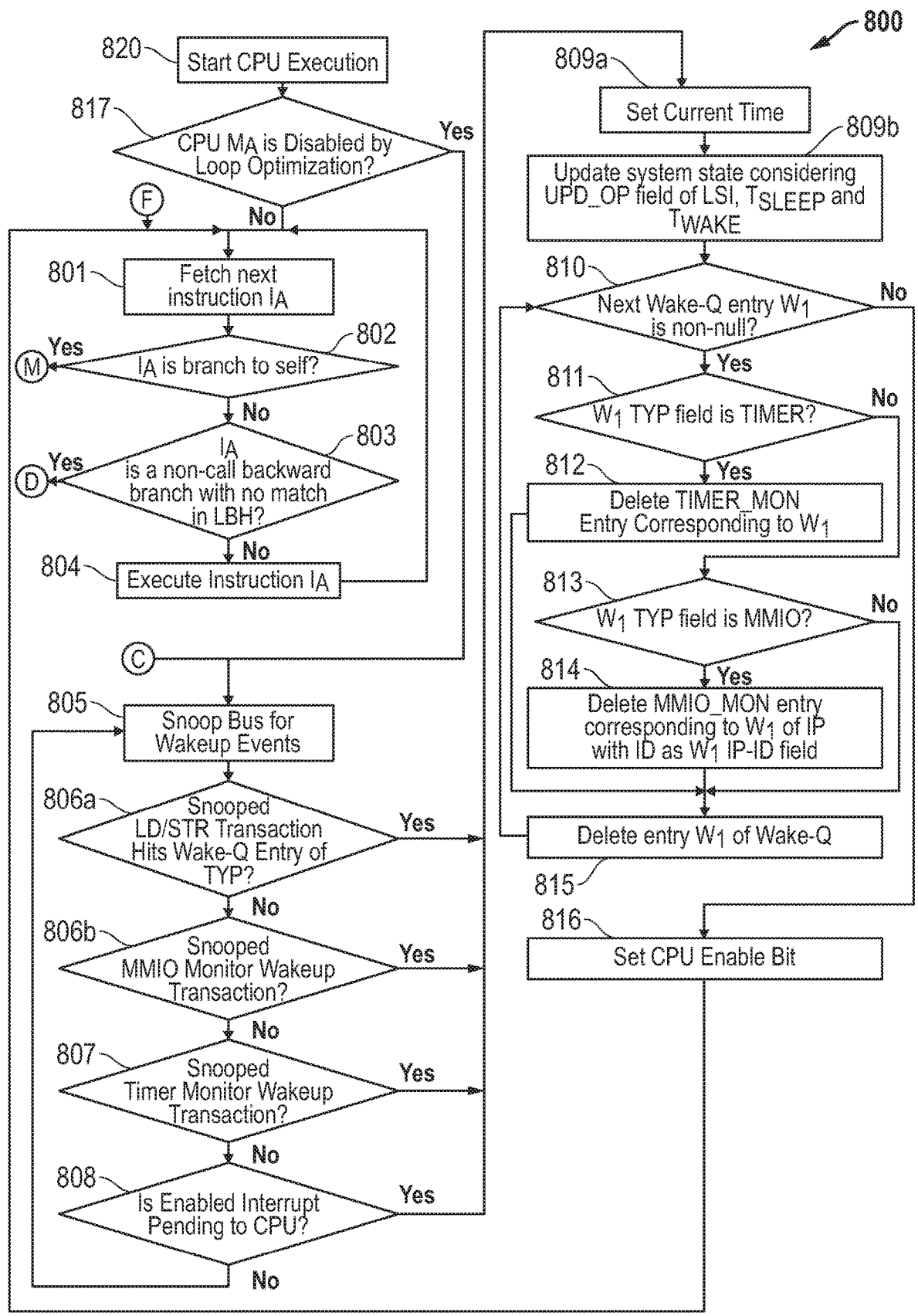
FIGS. 8 and 9A-B provide additional flowchart details of the proposed detection of idle loops not known a priori to be idle loops.
Figure 9A:
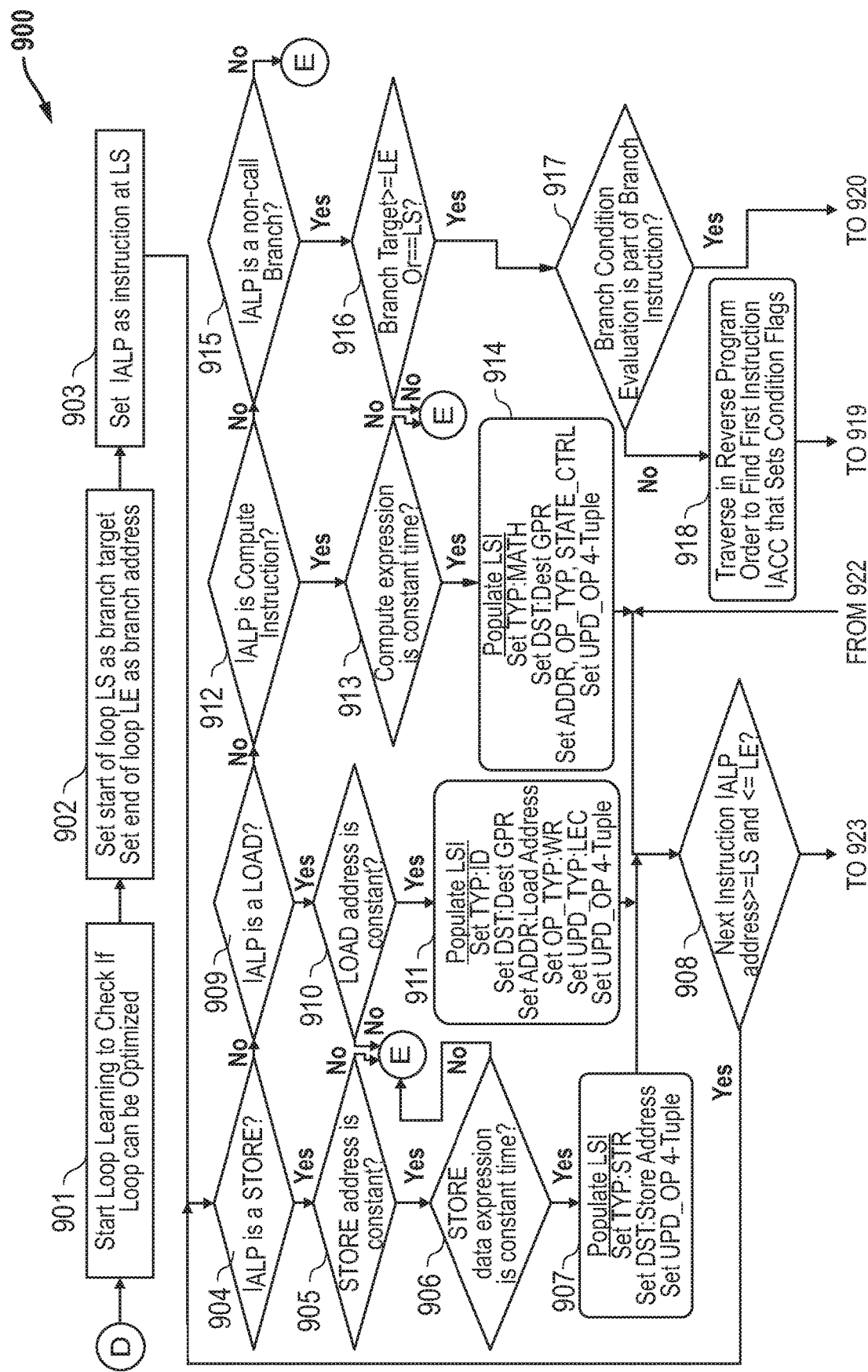
Figure 9B:
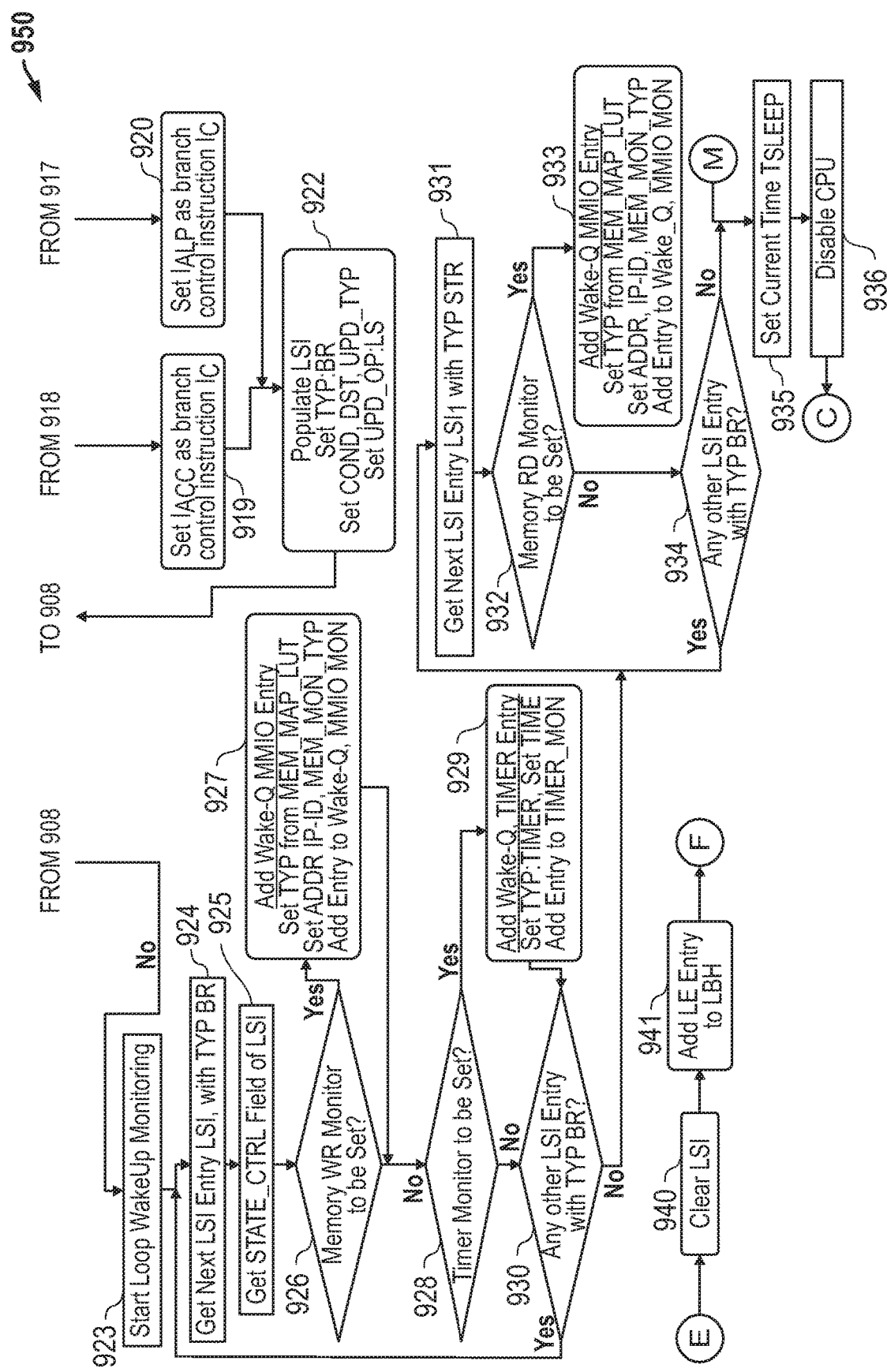

FIGS. 8 and 9A-B provide a more detailed flowchart of the proposed detection of idle loops previously unknown (e.g., not known a priori) to be idle loops. FIG. 8 shows the flowchart for CPU execution covering both wake-up from idle-loop disabled state (corresponding to FIG. 2 steps 204-212) as well as regular CPU execution (corresponding to FIG. 2 steps 212-220). FIGS. 9A-B shows the flowchart for CPU execution corresponding to idle-loop detection (corresponding to FIG. 2 step 214), learning of wake-up events (FIG. 2 step 216), and setup of wake-up monitors (corresponding to FIG. 2 step 218).

Looking first to embodiment 800 in FIG. 8, CPU execution is started in step 820 and then flows to step 817. If the CPU is not disabled due to idle-loop optimization in step 817, then CPU code execution follows steps 801-804 in an iterative fashion. If the instruction is found to be a branch-to-self in step 802 then flow diverts to step 935 in FIG. 9 to disable the CPU. If the instruction is a backward-branch that is not a function call and does not find a match in loop-branch-history (LBH) table in step 803, then the flow moves into FIGS. 9A-B step 901 for idle-loop detection and learning. If not, then the CPU instruction execution is continued. It is noted that whether the branch is a function call or not may be determined by the instruction attribute to set a return address, which in many architectures is referred to as the link register (LR). The LBH table keeps a list of recent non-call type loop backward branches for which the loop was found not to be a candidate for optimization after loop learning steps of FIGS. 9A-B were executed. Hence, the goal of adding the LBH table check in step 803 is to avoid loop learning overhead (e.g., diversion of flow to FIGS. 9A-B via D) for those loops that have been previously learnt to be non-optimizable.

Going back to step 817, if the CPU is disabled on idle loop optimization, then the loop controller logic 604 snoops the system bus 612 to detect occurrence of CPU wake-up events. If a read/write bus transaction whose address/size is a match with an entry in the WAKEUP_QUEUE 608 (e.g., match here implies that the address range touched by read/write transaction overlaps the ADDR/SIZE of the memory region marked in a WAKEUP_QUEUE entry and that the TYP field matches the transaction type (TYP=WR) for write transaction and the transaction type (TYP=RD) for read transaction) as indicated in step 806, then wakeup processing is initiated for the CPU in step 809a. It is noted that a write bus transaction having a match with WAKE-UP_QUEUE entry implies the case where the idle-loop taken/no-taken result of a loop branch is dependent on the data written by the write transaction, and hence the need to wake up and evaluate the loop exit condition. A bus read transaction on the other hand having a match implies the case where another master in the system is reading a memory location that is written by this disabled CPU, and hence the need to wake up and update the memory location with a value that would be present if the CPU had not been disabled (e.g., to prevent read of a stale memory value by the other master). Similarly, if MMIO_LOOP_MON or TIMER_MON wake-up bus transaction having CPU-ID pertaining to this CPU is received at steps 806b and 807 or an enabled interrupt is pending to this CPU in step 808, then wakeup processing is initiated for the CPU in step 809a.

Steps 809a-816 correspond to CPU wake from idle-loop disable state. The first step is to mark current system time as TWAKE and update the system state considering information stored in LSI 606 in step 809b. For instructions of type LD, STR, MATH and CMP, step 809b requires execution of the operation specified in the UPD_OP field of each entry of LSI table and use the computed value to update the value of the corresponding DST field. Number of iterations (Niter) value is determined from the equation: Niter=(TWAKE−TSLEEP)/(IITER*TINST), where IITER is the number of instructions per iteration loop and TINST is the average instruction execution time. For instructions of type BR, UPD_OP field of the LSI entry corresponding to the branch instruction is set to (0, AEXT) in case branch exit condition is satisfied else updates it to (AINT, 0). Each branch instruction in LSI is evaluated in program order and the first branch entry that has the AINT component of the UPD_OP field as 0 is selected and program execution start at the corresponding address AEXT (i.e. program counter is set accordingly). In case no branch LSI entry has AINT component of UPD_OP as 0, then program counter is set to enable program execution at loop start address LS.

Once the system state is restored, LSI table entries are deleted. Steps 810-815 iterate over the entries in the WAKE-UP_QUEUE 608 and delete the entry in the WAKEUP_QUEUE 608 as well as the corresponding monitor entries from the appropriate monitor structure MMIO_LOOP_MON 628 or TIMER_MON 618, depending on the TYP field of the WAKEUP_QUEUE 608 entry.

Looking now to embodiments 900/950 in FIGS. 9A-B, each instruction in the loop body (i.e., each instruction between Loop-Start (LS) and Loop-End (LE) in program execution flow) is examined to check if it meets the criteria for idle-loop optimization and structures 618, 606, 608, and 628 are populated. Steps 901-903 provide for the start of the loop learning and initial settings for the start of loop (LS), end of loop (LE), and instruction at start of loop ($I_{ALP}$). Steps 904-907 deal with store instructions in the loop body. If store address is a constant in step 905 and the store data value to be stored is a constant time expression in step 906 (where constant time expression implying that its final value after N-iterations can be evaluated in constant time by an expression rather than having to compute iteratively), then an LSI entry is created for the store instruction with INT_TYP as STR, DST field as the memory address of the store instruction, and UPD_OP field to a 4-tuple value. If response to either step 905 or 906 is "NO," then the loop is not considered to be a valid candidate for optimization and execution flow diverts to E, where LSI table is cleared and where LBT table entry is populated with loop backward branch address LE, followed by normal component behavior simulation at F (i.e., step 801 in FIG. 8).

Steps 909-911 pertain to handling load instructions. If the load address is a constant in step 910, then an LSI entry is populated with INT_TYP field as LD, ADDR field as the load memory address, DST field as the destination General Purpose Register (GPR) of the instruction, OP_TYP as WR, STATE_CTRL as LEC, UPD_OP 4-tuple field having second component as memory load, while the other three components are null. If answer to 910 is "NO," then the loop is not considered a valid target for optimization and execution continues at E. It is noted that load-linked (LL) and store-conditional (SC) instruction pairs, which are specialized instructions for software synchronization support and may be part of an idle-loop awaiting lock acquisition, will both be treated as load instructions and so as to generate a wake-up event when the memory location referenced by LL/SC is written by another master indicative of possibility of forward progress.

Steps 912-914 deal with computation instructions in the loop body. If the compute operation is constant time, then an LSI entry is created for the instruction with TYP field as MATH, DST field as the destination GPR of the instruction, ADDR, OP_TYP, STATE_CTRL and UPD_OP fields are set to values based upon the instruction.

Steps 915-922 deal with branch type instructions in the loop body. If branch target is contained within the loop body (i.e., branch represents a nested loop or if-then-else type construct) or if the branch target is outside the loop body but the branch instruction corresponds to a function call (e.g., sets the link-register), then the loop is not a target of optimization at step 915 and 916, and normal instruction execution continues at E. Otherwise, execution continues at step 917, where steps 917-920 are used to identify the branch control instruction (e.g., the instruction whose result decides the branch outcome). Eventually the GPRs or immediate value that is used to control the branch outcome and LSI entry is populated with fields COND, DST, STATE_CTRL and UPD_OP set to values based upon the instruction.

If all instructions in the loop have been analyzed and loop found to be a candidate for optimization in step 908, then wakeup monitor setting steps are executed in steps 923-934. An optional step, that is not shown here, but is possible to add before step 923, is to check if the CPU disabled time for the case where timer monitor is only required considering STATE_CTRL field of the LSI entries, is sufficiently long to justify CPU disabling. Moving on from step 923, for each LSI entry corresponding to the branch instruction, either one or both of memory-write and timer type wakeup monitors are added to WAKEUP QUEUE 608 and corresponding entries added to loop monitor structures 618 and 628, based on the value of STATE_CTRL field of LSI entry corresponding to the branch instruction in steps 925-929. Specific wake queue and monitor field values can also be set. The memory read monitors are then set in steps 931-934. For each LSI entry having INT_TYP as STR, if UPD_OP field has either of B or C or D components of the 4-tuple values as non-zero, then a memory read monitor entry is added to WAKEUP QUEUE 608 and corresponding entries added to loop monitor structures 628, monitoring memory address corresponding to the ADDR field of the LSI entry. Once wakeup monitors are set, CPU is disabled in steps 935 and 936.

When the CPU is subsequently enabled, for example by setting activating an enable flag, CPU execution flow starts again at step 801.

Details for Loop Structures

At this point, an introduction into the details of structures is provided: Loop State Info (LSI), Wakeup Queue, MMIO Loop Mon, Timer Mon, MEM Map LUT and the Loop Branch History (LBH) Table. For purpose of the description below, let the processor General Purpose Registers (GPRs) on right hand side (RHS) of the instruction expression be referred to as Source-GPRs and that on left hand side (LHS) of the instruction expression be referred to as Destination-GPR.

Loop State Info (LSI) Structure

LSI structure stores information pertaining to each instruction in the idle loop body, e.g., instructions between loop-start (LS) and loop-end (LE), with each row of LSI corresponding to a single instruction of the loop body. LSI structure is used to accomplish two main objectives: (a) it is used to update the system state following CPU wake up from idle loop optimization and (b) it is used to set up wakeup monitors. Details of each field of LSI is as follows:

INT_TYP: This field stores the instruction-type of the loop instruction. This field is set to LD for load instruction, STR for store instruction, MATH for computation instructions such as arithmetic instructions, CMP for comparison instructions and BR for branch instructions. Note that MATH includes all types of arithmetic and logical instructions catering to integer, floating point or SIMD operations. Note that move to/from types of instructions that are used to transfer data between CPU register sets can be treated as MATH type instructions, so long as there are no side-effects (such as exception generation or impact to some status bits) of the instruction. Any instruction beyond these (such a move to special purpose registers SPRs with side-effects, TLB maintenance, cache maintenance) render a loop non-optimizable and hence not relevant to LSI.

ADDR: This field stores the address pertaining to a load or store type instruction. For computational instructions, i.e. instructions having INT_TYP=MATH, ADDR field is a list of memory addresses that have been referenced by the Source-GPRs in the instruction expression. If Source-GPRs contain immediate values, this field remains NULL.

COND: Condition field is only relevant to instruction of type branch and allows values of EQ (equal) and NEQ (not equal) to signify whether the branch condition check is based on equality check or not. For example, if branch is taken under the condition that GPR r0 and r1 are equal, would set COND field as EQ, whereas if branch if taken when register r0 is greater than r1 would set COND field as NEQ. The purpose of this field is to help to optimize wake up on memory or memory-mapped-IO wakeup events. Specifically, when COND is EQ, the memory wake up monitor can be set to wake up the CPU when the memory location has a specific value, rather than waking the loop on each update to the memory location DST: Destination field is described here. For instructions with INT_TYP as LD or MATH, this field is the Destination-GPR of the instruction. For instruction with INT_TYP as STR, this field holds the memory address that is written to by the instruction. For instructions with INT_TYP as BR, this field is a 2-tuple value of the form (rx,ry) where rx/ry are the GPRs used in branch condition check. In case the branch condition check involves one GPR and an immediate value, DST field takes the form (rx, IMM), where IMM is the immediate value used in branch condition check. It should be noted that a branch instruction at loop-end may be unconditional, for such cases, this field remains NULL. For instructions with INT_TYP as CMP, the destination is the condition flags. However, the relevant condition and participating GPRs are stored as part of LSI entry corresponding to the branch, hence for purposes of this document, DST field for LSI entry corresponding to instructions with INT_TYP as CMP is left empty.

OP_TYP: Operation type field has possible values of WR i.e. write and UPD i.e. update. This field is relevant only for computational and load type instructions. For computation instructions, this field is set to WR if the Destination-GPR does not show up among Source-GPRs and LSI entries corresponding to Source-GPRs (i.e. LSI entries that have Source-GPRs marked in the DST field) are either non-existent (i.e. the particular Source-GPR is not updated in the loop) or have their OP_TYP field marked as WR, else OP_TYP is set to UPD. For instruction having INT_TYP as LD, this field is set to WR.

STATE_CTRL: State control field is used to indicate whether the Destination-GPR state is loop-externally-controlled (LEC) i.e. the value of the Destination-GPR is based on a system state that is external to the software loop executing on the CPU such as system memory content or MMIO register content OR loop-internally-controlled (LIC) i.e. Destination-GPR is only affected by loop internal state i.e. program variables/structures manipulated as part of loop code execution on the CPU OR a mix of the two i.e. LEC+LIC OR not varying in the loop i.e. CONST.

UPD_OP: For LSI entries corresponding to non-branch and non-compare type instructions i.e. having INT_TYP as MATH or LD or STR, this field marks the constant-time operation that formulates the modification to the state of the GPR or memory location specified in this LSI's DST field based on execution of a certain number of loop iterations. The following expression for UPD_OP is used for purpose of illustration:

$$UPD\_OP = f(Niter) = \Sigma Ai + \Sigma mem[Bi] + ((\Sigma Ci + \Sigma mem[Di])*Niter)$$

where Ai and Ci represents static constants, while Bi and Di represents static memory address. The field UPD_OP for LSI entry corresponding to non-branch, non-compare instruction can be represented as a 4-tuple (A, {B}, C, {D}), where A and C are static constants, while B,D are lists of memory addresses.

Details for Loop Monitors

This section provides an introduction to loop wakeup monitors, with the objective to wakeup CPU that is disabled on idle-loop optimization. Specifically, it describes the different types of monitors, their purpose and attributes. The monitors are monitoring specific system conditions and trigger wakeup of a CPU upon successful detection of the system condition. These system conditions pertain to system state that the idle-loop branch conditional check is dependent upon. Hence, the purpose of wakeup event is to wakeup the CPU, reevaluate the idle-loop conditional branch, to determine if the idle-loop exit condition has been met or not and decide execution flow of the program accordingly.

Memory Monitor

Memory monitor is used to wakeup a disabled CPU under specific conditions. There are two types of memory monitors: memory write monitors and memory read monitors. Memory Write Monitors: These are monitors that trigger wake of a CPU when a specific memory location is written to by any entity in the system. Memory write monitors are used to wake-up a CPU disabled on loop optimization in the case where the idle-loop has a conditional branch instruction whose taken/not-taken result is dependent on the data value of this memory address. So, the goal is to ensure, then when the memory is written, the CPU is woken up and re-evaluates the taken/not-taken result of the conditional branch and thereby to determine if the loop exit condition is satisfied or not. Memory Read Monitors: These are monitors that trigger wake of a CPU when a specific memory location is read by any entity in the system. Memory read monitors are used to wake-up a CPU disabled on loop optimization in the case where the idle-loop has an instruction with INT_TYP as STR such that the data written by the store instruction varies across iterations. So, the goal is to ensure, then when the memory is read, the CPU is woken up and it updates this memory location with a data value that it would have had if the CPU was not disabled, thereby preventing reading of a stale data value from this memory location.

Timer Monitor

Timer monitor is used to wake-up a disabled CPU upon expiry of a timer that marks completion of execution of a pre-calculated number of loop iterations Niter. The number of iterations is computed by solving the expression (LHS=RHS) for Niter, where LHS/RHS correspond to the expressions stored in UPD_OP field corresponding to the LSI entries whose DST field matches the GPRs noted in the 2-tuple DST field of the LSI entry of the branch instruction, with the UPD_OP expression is evaluated at time TSLEEP, e.g., UPD_OPTsleep.

Wakeup Queue Structure

WAKEUP_QUEUE is a structure that is present in each CPU: CPU0-CPUJ in the system and stores information pertaining to the wakeup monitors that can wakeup the CPU from disabled state. The fields of Wakeup Queue are as follows:

TYP: This field indicates the type of wakeup monitor. MEM_MON indicates a memory monitor whose address belongs to the memory space pertaining to system memory. MMIO_MON indicates a memory monitor whose address falls in the memory space pertaining to HW IP modules. TIMER_MON indicates a timer monitor.

TIME: This field is only relevant for Wakeup Queue entries having TYP field as TIMER_MON.

MEM_MON_TYP: This field is only relevant for Wakeup Queue entries having TYP field as MEM_MON and MMIO_MON. It takes two values: WR indicates that it is a memory write monitor while RD indicates it is a memory read monitor. This field is denoted as MM_TYP.

ADDR: This field is relevant for MEM_MON and MMIO_MON type monitors and represents the memory address whose change triggers wakeup event for the CPU.

SIZE: This field is relevant for MEM_MON and MMIO_MON type monitors and represents the size of the memory region starting at address ADDR that the write or read memory monitor needs to monitor.

The Loop Controller module in the CPU snoops the system bus transactions to detect a match with wake-up monitors entries stored in the WAKEUP_QUEUE. For monitor of TYP MEM_MON, the loop controller snoop logic checks system bus address floated on the bus for a match. For monitors of TYP MMIO_MON and TIMER_MON, the loop controller snoop logic listens to specialized bus transactions broadcast by MMIO_MON and TIMER_MON structures for CPU-ID matching its own. Upon a successful match, loop controller module initiates CPU wake-up.

MMIO Loop Monitor

MMIO_LOOP_MON is a structure that is associated with a specific IP. Each entry of this structure contains following fields: ADDR, SIZE, TYP, DATA, and a CPU-ID. Each MEMIO_LOOP_MON entry signifies a monitor that initiates a broadcast transaction on the bus having CPU-ID field identifier included, whenever it detects a read/write transaction having match with TYP field, the access overlapping memory region corresponding to ADDR/SIZE fields and optionally having a write data value matching the DATA field. Note that DATA field is relevant only for MMIO monitor entries having TYP as WR. In case the DATA field is empty/null, wakeup event is generated regardless of the transaction data value, so long as the transaction address overlaps with the memory region marked by ADDR and SIZE fields. For each entry of MMIO_LOOP_MON, there is an associated entry in the Wakeup Queue 109 of the specific CPU with ID as CPU-ID.

Timer Monitor

TIMER_MON is a structure, each entry of which signifies a unique timer monitor. Each entry has a TIME field to indicate the time (implying a counter set up to trigger after a time duration) for wakeup and the CPU having CPU-ID that is to be woken up. As with MMIO_LOOP_MON, each entry in TIMER_MON has a corresponding entry in CPU-ID's WAKEUP_QUEUE.

Memory Map Lookup Table

MEM_MAP_LUT structure contains the system memory map. Specifically, each entry specifies an address range marked by START_ADDR and SIZE pertaining to the specific memory region. TYPE field value MEM indicates that the memory region pertains to system memory, while TYPE being MMIO signifies that memory region pertains to memory mapped IO, with IP-ID field further specifying a unique ID pertaining to the IP to which the memory mapped region applies.

Loop Branch History Table

LOOP_BRANCH_HISTORY (LBH) structure is a table, each entry of which stores the program address corresponding to the backward branch instruction that triggers the loop learning and for which the loop learning flow concludes that the loop is not optimizable.

As described herein, a variety of embodiments can be implemented and different features and variations can be implemented, as desired.

For one embodiment, a system is disclosed including a processor having a plurality of operating modes including an active mode and a disabled mode, an interconnect bus coupled between the processor and one or more additional electronic circuits, and logic within the processor coupled to snoop the interconnect bus. The logic is programmed to detect a new idle loop based upon repeated instructions on the interconnect bus and to place the processor in the disabled mode based upon execution of the new idle loop, and the new idle loop represents a previously unknown idle loop for the processor.

In additional embodiments, the repeated instructions include at least one of a repeated store instruction, a repeated load instruction, a repeated compute instruction, or a non-call branch instruction. In certain further embodiments, the repeated instruction includes a repeated store instruction, and a new idle loop is further detected based upon a constant address and a constant-time data expression within the repeated store instruction. In certain further embodiments, the repeated instruction includes a repeated load instruction, and a new idle loop is further detected based upon a constant address within the repeated load instruction. In certain further embodiments, the repeated instruction includes a repeated compute instruction, and a new idle loop is further detected based upon a constant-time expression within the repeated compute instruction.

In additional embodiments, the logic is further programmed to store state data for the processor when the new idle loop is detected. In further embodiments, the logic is further programmed to use the state data to update the processor to a state it would attain if it were not disabled upon detection of a wakeup event.

In additional embodiments, the logic is further programmed to place the processor in the active mode based upon detection of a wakeup event for the new idle loop on the interconnect bus. In further embodiments, the logic is further programmed to store wakeup data for the idle loop and to use the wakeup data to detect the wakeup event.

In additional embodiments, the system includes a plurality of additional processors coupled to the interconnect bus where each has a plurality of operating modes including an active mode and a disabled mode. Each of the additional processors further includes logic within the processor coupled to snoop the interconnect bus. The logic is programmed to detect a new idle loop based upon repeated instructions on the interconnect bus and to place the processor in the disabled mode based upon execution of the new idle loop, and the new idle loop represents a previously unknown idle loop for the processor.

For one embodiment, a method is disclosed including operating a processor in a plurality of operating modes including an active mode and a disabled mode and communicating with an interconnect bus between the processor and one or more additional electronic circuits. The method also includes, with logic within the processor, snooping the interconnect bus to detect a new idle loop based upon repeated instructions on the interconnect bus and to place the processor in the disabled mode based upon execution of the new idle loop, and the new idle loop represents a previously unknown idle loop for the processor.

In additional embodiments, the repeated instructions include at least one of a repeated store instruction, a repeated load instruction, a repeated compute instruction, or a non-call branch instruction. In certain further embodiments, the repeated instruction includes a repeated store instruction, and the method further includes detecting a new idle loop based upon a constant address and a constant-time data expression within the repeated store instruction. In certain further embodiments, the repeated instruction includes a repeated load instruction, and the method further includes detecting a new idle loop based upon a constant address within the repeated load instruction. In certain further embodiments, the repeated instruction includes a repeated compute instruction, and the method further includes detecting a new idle loop based upon a constant-time expression within the repeated compute instruction.

In additional embodiments, the method includes, with the logic, storing state data for the processor when the new idle loop is detected. In further embodiments, the method includes, with the logic, using the state data to update the processor to a state it would attain if it were not disabled upon detection of a wakeup event.

In additional embodiments, the method includes, with the logic, placing the processor in the active mode based upon detection of a wakeup event for the new idle loop on the interconnect bus. In further embodiments, the method includes, with the logic, storing wakeup data for the idle loop and to use the wakeup data to detect the wakeup event.

In additional embodiments, the method includes operating a plurality of additional processors in a plurality of operating modes including an active mode and a disabled mode. The method also includes, with logic within each of the additional processors, snooping the interconnect bus to detect a new idle loop based upon repeated instructions on the interconnect bus and to place the processor in the disabled mode based upon execution of the new idle loop, and the new idle loop represents a previously unknown idle loop for the processor.

It is further noted that the functional blocks, components, systems, devices, and/or circuitry described herein can be implemented using hardware, software, or a combination of hardware and software. For example, the disclosed embodiments can be implemented using one or more programmable circuits that are programmed to perform the functions, tasks, methods, actions, and/or other operational features described herein for the disclosed embodiments. The one or more programmable circuits can include, for example, one or more processors and/or configurable logic devices (CLDs). The one or more processors can be, for example, one or more central processing units (CPUs), controllers, microcontrollers, microprocessors, hardware accelerators, ASICs (application specific integrated circuit), and/or other integrated processing devices. The one or more CLDs can be, for example, one or more CPLDs (complex programmable logic devices), FPGAs (field programmable gate arrays), PLAs (programmable logic array), reconfigurable logic circuits, and/or other integrated logic devices. Further, the programmable circuits, including the one or more processors, can be configured to execute software, firmware, code, and/or other program instructions that are embodied in one or more non-transitory tangible computer-readable mediums to perform the functions, tasks, methods, actions, and/or other operational features described herein for the disclosed embodiments. The programmable circuits, including the one or more CLDs, can also be programmed using logic code, logic definitions, hardware description languages, configuration files, and/or other logic instructions that are embodied in one or more non-transitory tangible computer-readable mediums to perform the functions, tasks, methods, actions, and/or other operational features described herein for the disclosed embodiments. In addition, the one or more non-transitory tangible computer-readable mediums can include, for example, one or more data storage devices, memory devices, flash memories, random access memories, read only memories, programmable memory devices, reprogrammable storage devices, hard drives, floppy disks, DVDs, CD-ROMs, and/or any other non-transitory tangible computer-readable mediums. Other variations can also be implemented while still taking advantage of the techniques described herein.

Unless stated otherwise, terms such as "first" and "second" are used to arbitrarily distinguish between the elements such terms describe. Thus, these terms are not necessarily intended to indicate temporal or other prioritization of such elements.

Further modifications and alternative embodiments of the described systems and methods will be apparent to those skilled in the art in view of this description. It will be recognized, therefore, that the described systems and methods are not limited by these example arrangements. It is to be understood that the forms of the systems and methods herein shown and described are to be taken as example embodiments. Various changes may be made in the implementations. Thus, although the invention is described herein with reference to specific embodiments, various modifications and changes can be made without departing from the scope of the present invention. Accordingly, the specification and figures are to be regarded in an illustrative rather than a restrictive sense, and such modifications are intended to be included within the scope of the present invention. Further, any benefits, advantages, or solutions to problems that are described herein with regard to specific embodiments are not intended to be construed as a critical, required, or essential feature or element of any or all the claims.

What is claimed is:

1. A system, comprising:
   a processor having a plurality of operating modes comprising an active mode and a disabled mode;
   an interconnect bus coupled between the processor and one or more additional electronic circuits; and
   logic within the processor coupled to snoop the interconnect bus, the logic being programmed to detect a new idle loop which represents a previously unknown idle loop for the processor, the detection based upon repeated instructions on the interconnect bus, learn a wakeup condition associated with the new idle loop which is stored for later use, place the processor in the disabled mode based upon detection of the new idle loop and learning of the wakeup condition, and wake up the processor in the disabled mode based on detecting the learned wakeup condition associated with the new idle loop;
   wherein the logic is further programmed to store state data for the processor when the new idle loop is detected and to use the state data to update the processor to a state the processor would attain if the processor were not disabled upon detection of a wakeup event.

2. The system of claim 1, wherein the repeated instructions comprise at least one of a repeated store instruction, a repeated load instruction, a repeated compute instruction, or a non-call branch instruction.

3. The system of claim 2, wherein the repeated instruction comprises a repeated store instruction and wherein a new idle loop is further detected based upon a constant address and a constant-time data expression within the repeated store instruction.

4. The system of claim 2, wherein the repeated instruction comprises a repeated load instruction and wherein a new idle loop is further detected based upon a constant address within the repeated load instruction.

5. The system of claim 2, wherein the repeated instruction comprises a repeated compute instruction and wherein a new idle loop is further detected based upon a constant-time expression within the repeated compute instruction.

6. The system of claim 1, wherein the logic is further programmed to place the processor in the active mode based upon detection of a wakeup event for the new idle loop on the interconnect bus.

7. The system of claim 6, wherein the logic is further programmed to store wakeup data for the idle loop and to use the wakeup data to detect the wakeup event.

8. The system of claim 1, further comprising:
   a plurality of additional processors coupled to the interconnect bus, each having a plurality of operating modes comprising an active mode and a disabled mode; and wherein each of the additional processors further comprises logic within the processor coupled to snoop the interconnect bus, the logic being programmed to detect a new idle loop based upon repeated instructions on the interconnect bus and to place the processor in the disabled mode based upon execution of the new idle loop; wherein the new idle loop represents a previously unknown idle loop for the processor.

9. A method, comprising:
   operating a processor in a plurality of operating modes comprising an active mode and a disabled mode;
   communicating with an interconnect bus between the processor and one or more additional electronic circuits; and
   with logic within the processor, snooping the interconnect bus to detect a new idle loop which represents a previously unknown idle loop for the processor, the detection based upon repeated instructions on the interconnect bus, learn a wakeup condition associated with the new idle loop which is stored for later use, place the processor in the disabled mode based upon detection of the new idle loop and learning of the wakeup condition, and wake up the processor in the disabled mode based on detecting the learned wakeup condition associated with the new idle loop; and with the logic within the processor, storing state data for the processor when the new idle loop is detected and using the state data to update the processor to a state the processor would attain if the processor were not disabled upon detection of a wakeup event.

10. The method of claim 9, wherein the repeated instructions comprise at least one of a repeated store instruction, a repeated load instruction, a repeated compute instruction, or a noncall branch instruction.

11. The method of claim 10, wherein the repeated instruction comprises a repeated store instruction, and further comprising detecting a new idle loop based upon a constant address and a constant-time data expression within the repeated store instruction.

12. The method of claim 10, wherein the repeated instruction comprises a repeated load instruction, and further comprising detecting a new idle loop based upon a constant address within the repeated load instruction.

13. The method of claim 10, wherein the repeated instruction comprises a repeated compute instruction, and further comprising detecting a new idle loop based upon a constant-time expression within the repeated compute instruction.

14. The method of claim 9, further comprising, with the logic, placing the processor in the active mode based upon detection of a wakeup event for the new idle loop on the interconnect bus.

15. The method of claim 14, further comprising, with the logic, storing wakeup data for the idle loop and to use the wakeup data to detect the wakeup event.

16. The method of claim 9, further comprising:

operating a plurality of additional processors in a plurality of operating modes comprising an active mode and a disabled mode; and with logic within each of the additional processors, snooping the interconnect bus to detect a new idle loop based upon repeated instructions on the interconnect bus and to place the processor in the disabled mode based upon execution of the new idle loop, wherein the new idle loop represents a previously unknown idle loop for the processor.

* * * * *